July 30, 1946.  F. C. NEUHART  2,405,097
PROCESS FOR NONDESTRUCTIVE HYDROCARBON CONVERSION
Filed Oct. 5, 1942
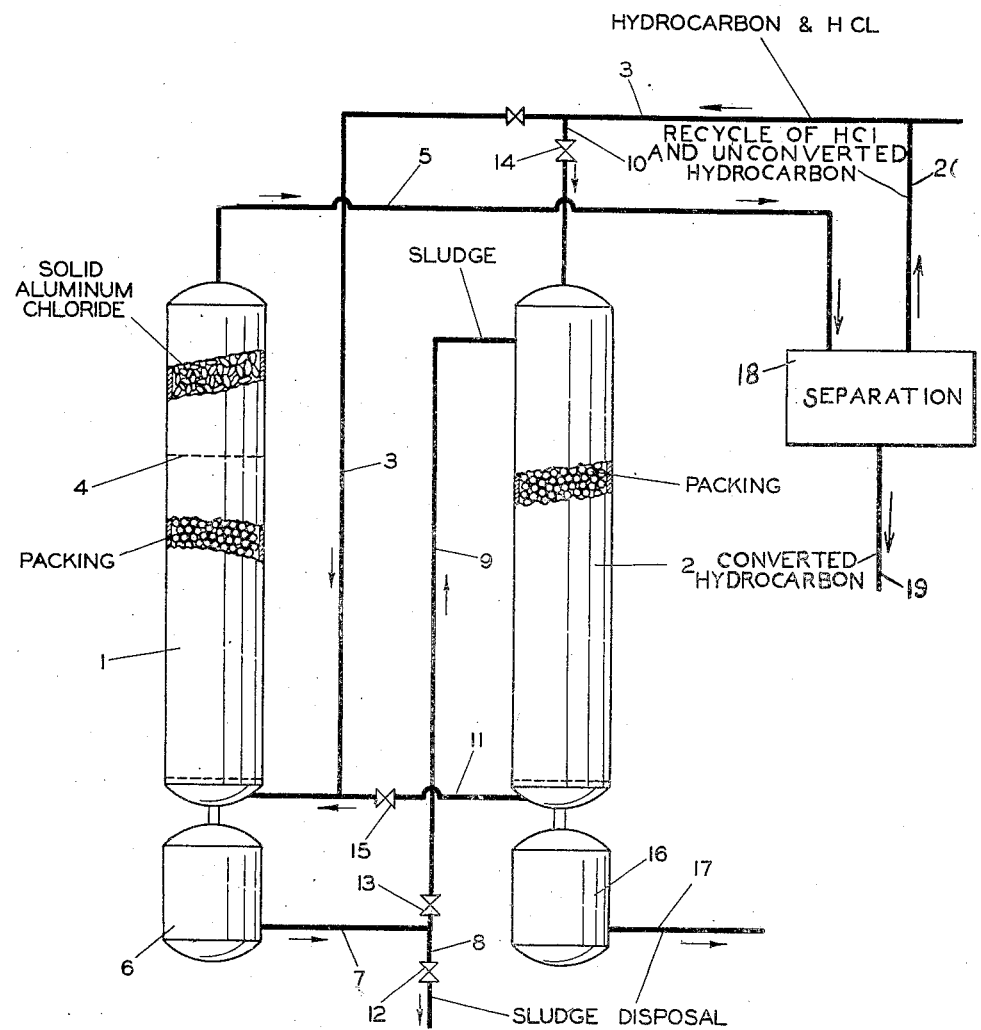
INVENTOR
FRED C. NEUHART
ATTORNEYS Patented July 30, 1946

2,405,097

UNITED STATES PATENT OFFICE 2,405,097

PROCESS FOR NONDESTRUCTIVE HYDROCARBON CONVERSION

Frederick C. Neuhart, Shidler, Okla., assignor to Phillips Petroleum Company, a corporation of Delaware Application October 5, 1942, Serial No. 460,854

1 Claim. (Cl. 260—683.5)

This invention relates to non-destructive hydrocarbon conversion processes utilizing sludge-forming metal halide catalysts of the Friedel-Crafts type. More, particularly it relates to the utilization of metal halide-hydrocarbon sludges formed in non-destructive hydrocarbon conversions such as isomerization and alkylation reactions catalyzed by aluminum chloride, aluminum bromide, and the like.

Of great commercial interest at the present time are the isomerization and alkylation of low-boiling hydrocarbons, particularly members of the paraffin series such as the butanes and pentanes. In these reactions a simple chemical change is effected under relatively mild conditions. In the case of isomerization a change in carbon skeleton without change in number of carbon atoms occurs, and in the case of alkylation the direct union of two molecules, such as an isoparaffin and an olefin, occurs to produce a higher molecular weight saturated hydrocarbon. These reactions are known to be catalyzed to a greater or lesser extent by the so-called Friedel-Crafts type metal halide catalysts, among the better known of which may be mentioned aluminum chloride, aluminum bromide, boron fluoride, zinc chloride, ferric chloride, antimony trifluoride, and other polyvalent metal halides. Aluminum chloride has to date received the greatest commercial acceptance due to its activity, relatively low cost, and availability. Accordingly, because of its importance, and for the sake of convenience, I shall describe my invention with particular reference to the isomerization of normal butane to isobutane as catalyzed by aluminum chloride. Application of the invention to other similar hydrocarbon conversions, using aluminum chloride or other Friedel-Crafts type metal halide catalysts which form sludges under the conditions of operation, will be apparent to those skilled in the art in view of the disclosure to follow.

In an isomerization process utilizing anhydrous aluminum chloride as a catalyst, the aluminum chloride may be charged to the process either as a solid, or as a slurry formed by dissolving and/or suspending a considerable amount of aluminum chloride in hydrocarbons or other suitable liquids. In either case, a liquid sludge is formed after a short period of operation, and the sludge, which at the outset is active as a catalyst, gradually becomes deactivated with use. Such sludges may comprise complexes of aluminum chloride with hydrocarbons, as well as dissolved aluminum chloride. In general, reference in this application to sludges refers primarily to sludges formed by contact of the hydrocarbon reactants with aluminum chloride, rather than to suspensions or slurries of aluminum chloride prepared for direct use as a primary catalyst, although the sludges may have appreciable quantities of aluminum chloride dissolved and/or suspended therein.

The utilization of such sludge to avoid wasting its catalytic activity would be of appreciable economic advantage and would also simplify problems of sludge disposal. My invention provides for such utilization in an effective manner as will be hereinafter described. Furthermore an automatic balance between the rate of sludge formation and the rate of depletion of its catalytic activity is provided. The sludge formed by the process of this invention is relatively free from asphaltic or tarry materials, and has appreciable catalytic activity which may be exploited at mild conditions of temperature similar to those used in the reaction zone proper.

Aluminum chloride sludge has been found to be highly corrosive to most ordinary metals and other materials of construction when in motion. Thus it would be relatively undesirable to use such sludge by circulation at relatively high rates of flow, bubbling gaseous reactants through it, or subjecting the sludge in other ways to violent agitation. One preferred aspect of my invention is the utilization of the catalytic activity of sludges in such a manner as to avoid erosion and/or corrosion problems from motion of the sludge.

It is an object of this invention to provide for improved non-destructive hydrocarbon reactions wherein a Friedel-Crafts type metal halide is used as catalyst under relatively mild conditions. Another object is to provide for the utilization of metal halide sludge formed during such reactions. A further object is to provide for carrying out such hydrocarbon conversions as isomerization, alkylation and the like with aluminum halide and similar catalysts continuously. Yet another object is to utilize the catalytic activity of aluminum chloride-hydrocarbon sludges. Still another object is to provide for establishment of a balance between the rate of sludge production and the rate of deactivation thereof in such processes. A still further object is to prevent severe erosion and corrosion of equipment used in the process. Another object is to provide suitable apparatus for such processes. Many other objects and advantages of the invention will become apparent as the disclosure proceeds.

In general, in carrying out the invention, sludge formed during conversion of the low-boiling hydrocarbons over solid aluminum chloride and similar catalysts, is contacted with incoming reactants prior to their contact with the catalyst. This is done in such a manner that the catalytic activity of the sludge serves to effect an appreciable proportion of the desired conversion, and the sludge becomes more or less completely deactivated. This is preferably accomplished by dividing the catalyst chamber into an upper and a lower section, filling the upper section with solid granular anhydrous aluminum chloride either alone or supported on inert carrier materials, and filling the lower section with stone rings or other suitable inert packing. The hydrocarbons to be converted are passed continuously upwardly from the bottom of the chamber through the packing and the solid aluminum chloride respectively. The sludge produced from the solid aluminum chloride as the conversion proceeds, drains downwardly onto the packing to give a highly extended surface of active sludge. An automatic sludge balance is established by this arrangement because the greater the percentage of the conversion borne by it, the smaller the volume of the sludge produced from the solid aluminum chloride; and as its activity becomes depleted, more and more of the conversion is borne by the solid aluminum chloride which in turn automatically produces more sludge to replace that deactivated. Although not so satisfactory, the solid catalyst may be disposed in one chamber and the packed section provided in a separate chamber, with the sludge being continuously or intermittently transferred from the catalyst filled chamber to the packed chamber by any suitable means.

Another advantage of the arrangement described above is that the motion of the sludge at the walls of the containing vessels is reduced to a minimum, the flow rate of sludge through the apparatus is slow, and consequently the erosion and/or corrosion is reduced sufficiently to permit the use of steel and other ordinary materials of construction.

The contact time of the hydrocarbon reactants with sludge will vary with the type of conversion involved. This contact time is generally chosen so that the sludge removed from the bottom of the packed contacting zone is substantially deactivated. The automatic balance between sludge formation and depletion referred to above, operates in any case and it is merely a matter of experiment to choose a contact time which gives optimum utilization of catalyst activity for a particular type of conversion. When the preferred type of catalyst chamber containing a packed section below the catalyst proper is used, sludge may sometimes be removed from the bottom thereof and passed to one or more other packed chambers for contact with at least part of the incoming reactants in order to deplete completely any catalytic activity remaining in the sludge. In effect such subsequent chamber or chambers function as extensions of the first packed section. Sludge expelled from the system may be sent to sludge disposal or to a process for the recovery of metal halide as desired.

Temperature and pressure conditions used in my process are mild so that no extensive decomposition occurs, being ordinarily the conventional conditions for the various types of conversions to which the invention may be applied. Temperatures in the sludge contacting zone will generally be about the same as those in the catalyst zone with a small temperature gradient sometimes being found due to heat of reaction. Hydrocarbons may be passed through the apparatus in gaseous or liquid form with the former often being preferred. Catalyst activators such as hydrogen halides and the like are often used.

The accompanying drawing shows diagrammatically one form of apparatus for carrying out the isomerization of normal butane to isobutane, portions of the outer walls of the chambers being cut away to expose the contents thereof to view. The drawing and description will also serve to exemplify my invention. Numerous other modifications may be used, for carrying out isomerization or alkylation reactions and the like by following the teaching of this disclosure, and no particular limitations are therefore implied.

In the drawing, dry gaseous normal butane, either pure or containing minor amounts of isobutane and/or lighter gases, such as propane, along with activating amounts of anhydrous hydrogen chloride or other activating agent, is introduced to the system and into the bottom of catalyst chamber 1 through conduit 3. The hydrogen chloride in most cases will comprise from 3 to 15 mol per cent of the feed and may be introduced into the reaction chamber in other ways if desired. It is sometimes quite advantageous to introduce the hydrogen chloride separately into chamber 1 somewhat above the level of the inlet of line 3, at or below the level of plate 4 by means not shown. In this way the concentration of hydrogen chloride at the bottom of chamber 1, and in the sludge withdrawn therefrom, is reduced to a minimum with an attendant reduction of corrosion. Hydrogen chloride incorporated in the sludge from the upper part of chamber 1 is sufficient for promoting any catalytic reaction occurring in the lower part thereof, but is almost completely stripped from the sludge by the gaseous butane by the time the sludge reaches the bottom of the chamber. Chamber 1 is operated at a pressure of 100 to 150 pounds per square inch gauge and a temperature of about 200° F. The feed introduced through conduit 3 is heated to the approximate reaction temperature by means not shown. If necessary the butane is dehydrated before entering the system. The flow rate will generally be between about 0.1 to 2.0 liquid volumes of hydrocarbon feed per volume of catalyst chamber per hour.

Granular solid anhydrous aluminum chloride of about 20 mesh or larger is packed into the top of chamber 1, being separated from the bottom part of this chamber by means of a screen 4 or other means which will permit the reacting hydrocarbons to pass upward through the full length of the tower and the sludge to flow downward over the packing. Screen 4 may be dispensed with and the solid aluminum chloride allowed to rest on the upper surface of the packing. The packing which fills the bottom section of chamber 1 may be ceramic-ware rings or other contact material not readily attacked by aluminum chloride.

As the isomerization reaction proceeds, a liquid aluminum chloride sludge is formed which contains considerable aluminum chloride that is still catalytically active insofar as the isomerization reaction is concerned. The sludge produced runs down from the solid aluminum chloride and distributes itself upon the packing in such a manner as to give a highly extended surface of catalytically active sludge. By passing the hydrocarbons to be converted upward from the bottom through chamber 1, they first come into contact with the least active aluminum chloride sludge and as they progress upward they come in contact with sludge which is more and more active until finally the solid aluminum chloride is reached. A substantial part of the hydrocarbon conversion will have taken place before reaching the solid aluminum chloride. The remaining hydrocarbon conversion will be brought about by the solid aluminum chloride, and simultaneously aluminum chloride sludge will be produced which flows down onto the packing in the bottom of chamber 1 to replace the sludge that has been spent or deactivated.

The amount of sludge formed will depend upon the percentage of conversion load the solid aluminum chloride has to bear. For example, if there is very little sludge, or what sludge there is in the bottom part of chamber 1 is largely spent or deactivated, very little hydrocarbon conversion will take place in this part of the chamber. Consequently the solid aluminum chloride will have to bring about a larger percentage of the conversion which in turn results in the formation of sludge in relatively large quantities which accumulates in the bottom of the chamber. As additional butane is brought into the tower for conversion, the sludge produced will bear a substantial part of the conversion load and the solid aluminum chloride a smaller part than before. Therefore, a smaller amount of sludge is produced. Thus an automatic balance is maintained between the rate of formation of fresh catalytically active aluminum chloride sludge and the rate of deactivation of the sludge.

The effluent from chamber 1 which leaves the top thereof through conduit 5 comprises unconverted normal butane, isobutane produced in the process, traces of 5-carbon-atom and heavier hydrocarbons, hydrogen chloride, and minor amounts of other gases lighter than isobutane which may have been introduced into the feed and/or produced by side reactions occurring in chamber 1. Hydrogen and propane are frequently used in the process to minimize undesired side reactions and maintain catalyst life. The amount of propane used may be as high as 10 per cent or more, while smaller volumes of hydrogen are usually used, if at all. It will be noted that the total volume of reactants and products passes through first the sludge and then the primary catalyst without any intermediate or concomitant separation of products. The further treatment of the effluents in conduit 5 is shown on the drawing diagrammatically by unit 18; it will be understood that these effluents may be subjected to any of the separating or other steps known to the art. These usually include the recovery of isobutane as a product of the process through conduit 19, and separation of hydrogen chloride, at least part of the propane, and unconverted normal butane, which are recycled via conduit 20 to catalyst chamber 1. Various other expedients which are known to the art will, of course, be utilized as particular circumstances indicate.

The sludge expelled from the bottom of chamber 1 is collected in receiver 6 from which it may be removed and discarded or sent to other disposal or utilization by conduits 7 and 8. If it is impractical to deactivate the sludge completely in chamber 1, all or part of it may be pumped or pressured into the top of chamber 2 through conduits 7 and 9. Chamber 2 is similar to the lower part of chamber 1, containing packing adapted to insure intimate contact between sludge and hydrocarbons. All or part of the butane and hydrogen chloride feed to the system may be passed through chamber 2 in contact with the sludge before entering chamber 1. Conduits 10 and 11 are provided for this purpose. Valves 12, 13, 14, and 15 are provided in conduits 8, 9, 10, and 11 for shutting off chamber 2 entirely or for controlling the flow of hydrocarbons and sludge therethrough as required. Isomerization of part of the butane is accomplished in chamber 2 and the remaining catalytic activity of the sludge is thus exploited. The spent or deactivated sludge from chamber 2 is collected in receiver 16 and may pass therefrom through line 17 to subsequent use, sludge disposal, aluminum chloride recovery processes, etc.

As has been indicated previously, it is preferred that the charge stock be dried before being passed to the system. However, it has been found that most commercial dehydration processes leave minor amounts of water in the effluent hydrocarbon material, ordinarily of no great consequence but enough to have an adverse effect upon aluminum chloride. My process has the additional advantage that the charge is thoroughly dehydrated by the sludge before the hydrocarbon material reaches the aluminum chloride. Other impurities in the charge are also removed by the sludge.

There are other ways in which this process may be practiced other than those indicated by the drawing without departing from the spirit of the invention. For example, any number of chambers such as chamber 1 or chamber 2 or both, may be employed. Either parallel or countercurrent flow of the hydrocarbon with respect to the sludge flow, or combinations of both, may be used, although the countercurrent flow of sludge and hydrocarbons in chamber 1 as shown in the drawing is preferred. The relative directions of flow in chamber 2 may be varied with more latitude. Chambers or towers may be operated in series or parallel or combinations of both. Other systems of sludge collection or disposal from the chambers may be employed. While the use of packed towers is preferable for the reasons hereinabove set forth, other means for contacting sludge with reactants may be used.

This invention is applicable to non-destructive hydrocarbon conversion processes using aluminum chloride or other Friedel-Crafts type metal halide as the conversion catalyst, provided a liquid sludge still catalytically active results. It is particularly applicable to hydrocarbon conversions such as isomerization and alkylation, especially when low-boiling hydrocarbons such as pentane and lighter are involved.

I claim:

A process for the isomerization of normal butane to isobutane which comprises passing an anhydrous gaseous mixture comprising a major proportion of normal butane admixed with minor proportions of hydrogen chloride through at least one packed chamber containing a packing material adapted to effect intimate gas-liquid contact, passing a partially deactivated aluminum chloride sludge from a source hereinafter described into said chamber for contact with said gaseous mixture at conditions of temperature, pressure, and contact time to effect a preliminary conversion of normal butane and to utilize catalytic activity of said sludge, passing resulting gaseous mixture into the bottom of a catalyst chamber for upward flow therethrough, said catalyst chamber being provided in an upper section thereof with a solid anhydrous aluminum chloride catalyst and in a lower section thereof with a packing material over which aluminum chloride sludge formed from said catalyst becomes distributed, at conditions of temperature, pressure, and contact time to effect in said lower section a partial production of isobutane and a partial deactivation of said sludge and to effect in said upper section a further production of isobutane and the formation of said sludge, removing partially deactivated sludge from the bottom of said catalyst chamber for passage into said packed chamber as hereinabove described, passing gases from the top of said catalyst chamber to separating means, separating isobutane product, and recycling hydrogen chloride and unconverted normal butane to further isomerization.

FRED. C. NEUHART.